INVENTOR.
GORDON S. SLOUGHTER
BY
Campbell, Brumbaugh, Free & Graves
HIS ATTORNEYS.

Oct. 11, 1955 G. S. SLOUGHTER 2,720,584

FREQUENCY DISCRIMINATOR

Filed Nov. 22, 1949 3 Sheets-Sheet 2

INVENTOR.
GORDON S. SLOUGHTER
BY
Campbell, Brumbaugh, Free & Graves
HIS ATTORNEYS.

INVENTOR.
GORDON S. SLOUGHTER
BY
Campbell, Brumbaugh, Free & Graves
HIS ATTORNEYS.

United States Patent Office 2,720,584

Patented Oct. 11, 1955

2,720,584

FREQUENCY DISCRIMINATOR

Gordon S. Sloughter, Ridgefield, Conn., assignor, by mesne assignments, to Schlumberger Well Surveying Corporation, Houston, Tex., a corporation of Delaware Application November 22, 1949, Serial No. 128,887

4 Claims. (Cl. 250—27)

The present invention relates to discriminator systems for frequency modulated signals and more specifically to a new and improved sub-carrier frequency modulation discriminator system for use in multichannel telemetering or the like, for example.

In monitoring the operation of a remote device such as a guided missile in flight, for example, the desired test data are usually transmitted from the device to a reception station in the form of one or more modulated sub-carrier signals impressed on a radio frequency carrier signal. In a typical telemetering system of this character, the respective data in the device are represented by a plurality of sub-carrier signals, frequency modulated, respectively, by electrical signals which may be D. C. as well as A. C. signals of different frequencies, and these sub-carrier signals are used to modulate a radio frequency carrier signal.

The detection of the frequency modulated carriers to obtain signals accurately representative of the original test data is a difficult problem. Discriminator circuits employed heretofore for this purpose such as the Foster-Seely and cycle counter circuits, for example, are most linear for very small deviations. Such systems are not readily adapted for applications in which linearity with frequency over a relatively wide range, stability, and relatively high output voltage are required.

It is an object of the invention, accordingly, to provide new and improved frequency modulation discriminator apparatus which is free from the above noted deficiencies of the prior art devices.

Another object of the invention is to provide new and improved frequency modulation discriminator apparatus of the above character which is capable of operating selectively at different carrier frequencies in a relatively wide range with low distortion and a relatively high power output.

A further object of the invention is to provide new and improved frequency modulation discriminator apparatus of the above character which is exceedingly stable in operation, whereby frequency modulated signals carrying D. C. intelligence may be effectively accommodated.

These and other objects of the invention are attained by separating the complex wave received from the remote device into its frequency modulated signal components, each of which is supplied to a separate channel. In each channel, alternate pulses of different polarity are generated for each cycle of the alternating wave input. Certain of these pulses are used to trigger a novel discriminator circuit which provides an output that is a linear function of the pulse repetition rate.

The discriminator circuit of the invention comprises an unbalanced trigger circuit which continuously generates complementary square waves, alternate square waves being initiated by the triggering pulses generated in the channel and being constant in time duration, and the time duration of each intervening square wave being equal to the difference between the reciprocal of the input frequency and said constant time duration. The two groups of square waves are combined in such fashion as to produce a resultant output which is accurately linearly proportional to the frequency of the signal input to the channel. The resultant output may be fed to high speed recording devices, for example, and means may be provided according to the invention for preventing inadvertent overloading of such recording devices, if desired.

Additional objects and advantages of the invention will be apparent from the following detailed description of several typical forms thereof, taken in conjunction with the accompanying drawings in which.

Figure 1:
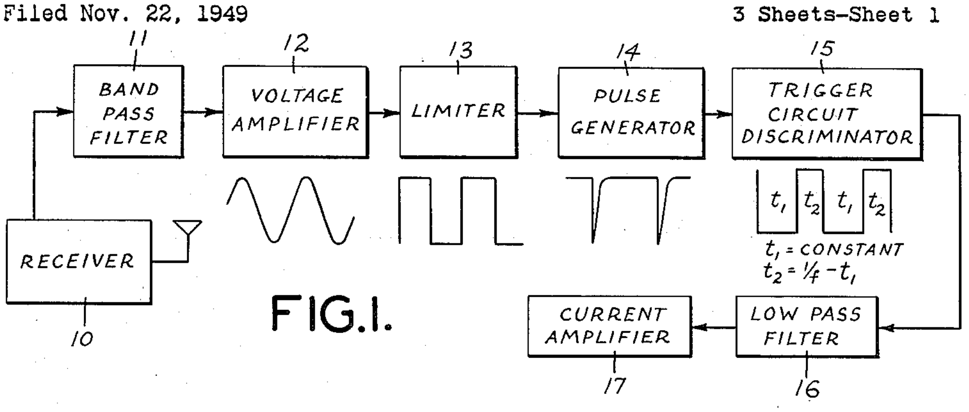
Fig. 1 is a block diagram illustrating a typical sub-carrier discriminator system constructed according to the invention.

A typical sub-carrier frequency modulation discriminator such as might be employed for multichannel telemetering is shown in the block diagram of Fig. 1. It may comprise, for example, a receiver 10 designed to pick up a carrier signal modulated in accordance with a plurality of sub-carriers, which are modulated, respectively, as functions of different kinds of test data, for example. The output of the receiver 10 is fed to a suitable band pass filter 11 which is appropriately designed to pass only a selected one of the sub-carrier signals. The sub-carrier output from the band pass filter 11 passes to a conventional voltage amplifier 12, the output of which is fed to a limiter 13, the purpose of which is to convert the sinusoidal signal output of the voltage amplifier 12 to a square wave signal, as shown in Fig. 1.

The square wave signal output from the limiter 13 actuates a pulse generator 14 which produces a narrow pulse coinciding with the beginning of each cycle of the square wave signal. The pulses produced by the pulse generator 14 are employed to trigger a novel discriminator circuit 15 which will be described in greater detail hereinafter. The discriminator 15 is designed to produce a pulse of constant time duration $t_1$ each time it receives an actuating pulse from the pulse generator 14, after which it remains dormant until a succeeding pulse is received. It will be understood, therefore, that the total time duration for the pulse $t_1$ and for the dormant period will be equal to the period of the pulses supplied from the pulse generator 14.

The output of the trigger circuit discriminator 15 is fed to a low pass filter 16 which serves to filter out most of the sub-carrier frequency, leaving only the modulation impressed thereon. The output of the low pass filter 16 is then fed to a conventional current amplifier 17, the output of which may energize any suitable work device such as a high speed recorder, for example.

Figure 2:
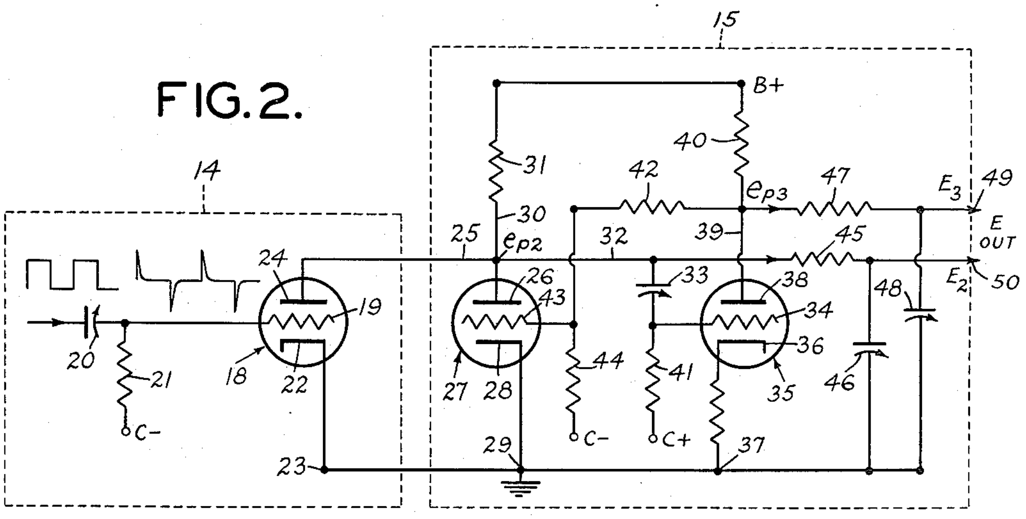
Fig. 2 is a schematic diagram of a basic discriminator circuit according to the invention which may be employed in the system of Fig. 1.

Fig. 2 illustrates in simplified form a typical pulse generator 14 and discriminator circuit 15 constructed according to the invention. The pulse generator 14 may comprise, for example, a conventional triode 18 having a grid electrode 19 connected to a short time constant differentiating circuit including a series condenser 20 and a shunt resistor 21. The grid 19 is normally biased beyond cut-off so that only positive pulses will cause the tube 18 to become conducting.

The cathode 22 of the tube 18 is connected to ground at 23 and the plate 24 of the tube is connected by a conductor 25 to the plate electrode 26 of a second electron tube 27, the cathode 28 of which is also connected to ground at 29. The plate electrode 26 of the tube 27 is also connected through a conductor 30 and a resistor 31 to the positive terminal of a source of plate supply voltage (not shown).

The plate 26 of the tube 27 is also connected by a conductor 32 and a series condenser 33 to the grid electrode 34 of another electron tube 35. The cathode 36 of the tube 35 may be grounded at 37 and the plate electrode 38 is connected through a conductor 39 and a resistor 40 to the positive terminal of the source of plate supply voltage (not shown). A resistor 41 is connected between the grid 34 of the tube 35 and a source of positive biasing voltage (not shown). The plate 38 of the tube 35 is also connected by the conductor 39 and a resistor 42 to the grid 43 of the tube 27, a resistor 44 being connected between the grid 43 and a source of negative biasing voltage (not shown).

The pulse output appearing between the plate 26 of the tube 27 and ground 29 is filtered in any suitable manner as by a filter circuit comprising a series resistor 45 and a shunt condenser 46. In similar fashion, the pulse output appearing between the plate 38 of the tube 35 and ground 37 may be filtered by a conventional filter circuit comprising a series resistor 47 and a shunt condenser 48. The output from the discriminator 15 may then be taken across the conductors 49 and 50 and it will comprise the intelligence impressed upon the subcarrier selected by the band pass filter 11.

In the absence of pulses from the tube 18, the discriminator circuit 15 is inoperative. In this state, the tube 27 is nonconducting since it has a negative bias impressed upon its grid 43, whereas the tube 35 is conducting because it has a positive bias impressed upon its grid 34. Assume now that a negative pulse is generated at the plate 24 of the tube 18. This pulse is transmitted directly to the plate of the tube 26 and through the condenser 33 to the grid 34 of the tube 35. Since the pulse applied to the grid 34 of the tube 35 is negative, the tube 35 immediately becomes nonconducting and the voltage at its plate 38 rises to the plate supply voltage. This rise in voltage at the plate 38 of the tube 35 is transmitted through the resistor 42 to the grid 43 of the tube 27 so that it immediately becomes conducting. Saturation plate current now flows through the tube 27 and the tube 35 remains nonconducting for a specific time $t_1$ determined by the time required for the condenser 33 to discharge through the resistor 41 sufficiently to permit the tube 35 to begin conducting once again. The circuit then returns abruptly to its original inoperative condition which continues until the next pulse is received from the pulse generator tube 18.

Figure 3A:
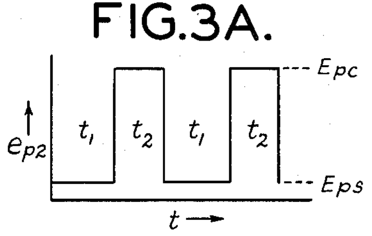
Figs. 3A and 3B are graphs illustrating the voltage relationships existing in the circuit of Fig. 2 at different times in the operating cycle.
Figure 3B:
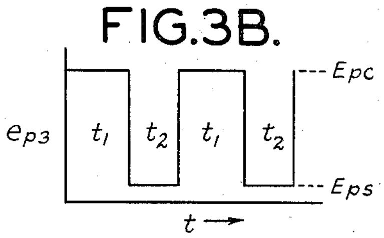
Figure 3C:
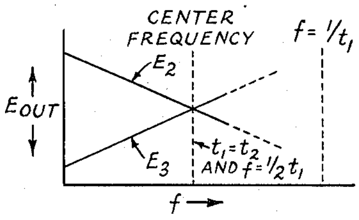
Fig. 3C is a graph showing how the two filtered outputs of the discriminator of Fig. 2 vary as a function of frequency.

For ideal conditions of operation, the relationships between the voltages $e_{p2}$ and $e_{p3}$ at the plates 26 and 38, respectively, are as shown in Figs. 3A and B, while Fig. 3C indicates how the D. C. output voltages vary as a function of frequency. If $f_0$=center frequency of sub-carrier passed by filter 11,
$f$=sub-carrier frequency at any instant,
$t_1$=time duration of pulse produced by discriminator 15 upon receipt of a pulse from pulse generator 14 (constant for moderate deviations in frequency from $f_0$),
$t_2=1/f-t_1$,
$Epc$=Plate voltage of either tube (27 or 35) at cut-off,
$Eps$=Plate voltage of either tube (27 or 35) at saturation,
$E_2$=Filtered output of the tube 27,
$E_3$=Filtered output of the tube 35, and
$E$=Voltage between terminals 49 and 50=$E_3-E_2$ then $$E_2=e_{p2}\text{ average}=Epc-\frac{t_1}{t_1+t_2}(Epc-Eps) \quad (1)$$

$$=Epc-ft_1(Epc-Eps) \quad (2)$$

or $$E_2=k_1-fk_2 \text{ (see Fig. 3C)} \quad (3)$$

Similarly, $$E_3=Eps+ft_1\ (Epc-Eps) \quad (4)$$
$$=k_3+fk_2 \text{ (see Fig. 3C)} \quad (5)$$
$$E=E_3-E_2=(2\,ft_1-1)\ (Epc-Eps) \quad (6)$$
$$=fk_4-k_5 \quad (7)$$

For the center of frequency, $$f_0=\frac{.5}{t_1}\text{ and }E_3-E_2=0 \quad (8)$$

Within the limits of operation in which the above relationships may be applied, it appears from Equation 7 that the output across the terminals 49 and 50 of the discriminator 15 in Fig. 2 is a perfectly linear function of frequency. The amplitude of the output voltage for a given frequency deviation is seen to depend on the quantity ($E_{pc}-E_{ps}$), $E_{pc}$ being essentially the B+ supply voltage while $E_{ps}$ is determined by the circuit constants and tube characteristics.

While the basic discriminator circuit shown in Fig. 2 is effective, it tends to become nonlinear because $t_1$ cannot be maintained perfectly constant. Although $t_1$ depends primarily on the condenser 33 and the resistor 41 as well as the voltage $e_{p2}$ for moderate deviations from the center frequency, as $f$ approaches 2 $f_0$, increasingly less time is allowed for the condenser 33 to charge through the resistors 31 and 41 and the grid 34 of the tube 35. The potential across the condenser 33 at the instant the circuit is triggered will, therefore, be less. Hence, the time $t_1$ required after triggering for the condenser 33 to discharge through the resistor 41 to the point at which the circuit returns to the steady state will be correspondingly decreased. Also, when operating about high center frequencies, stray capacities tend to produce a departure from square wave operation which may introduce nonlinearity.

Figure 4:
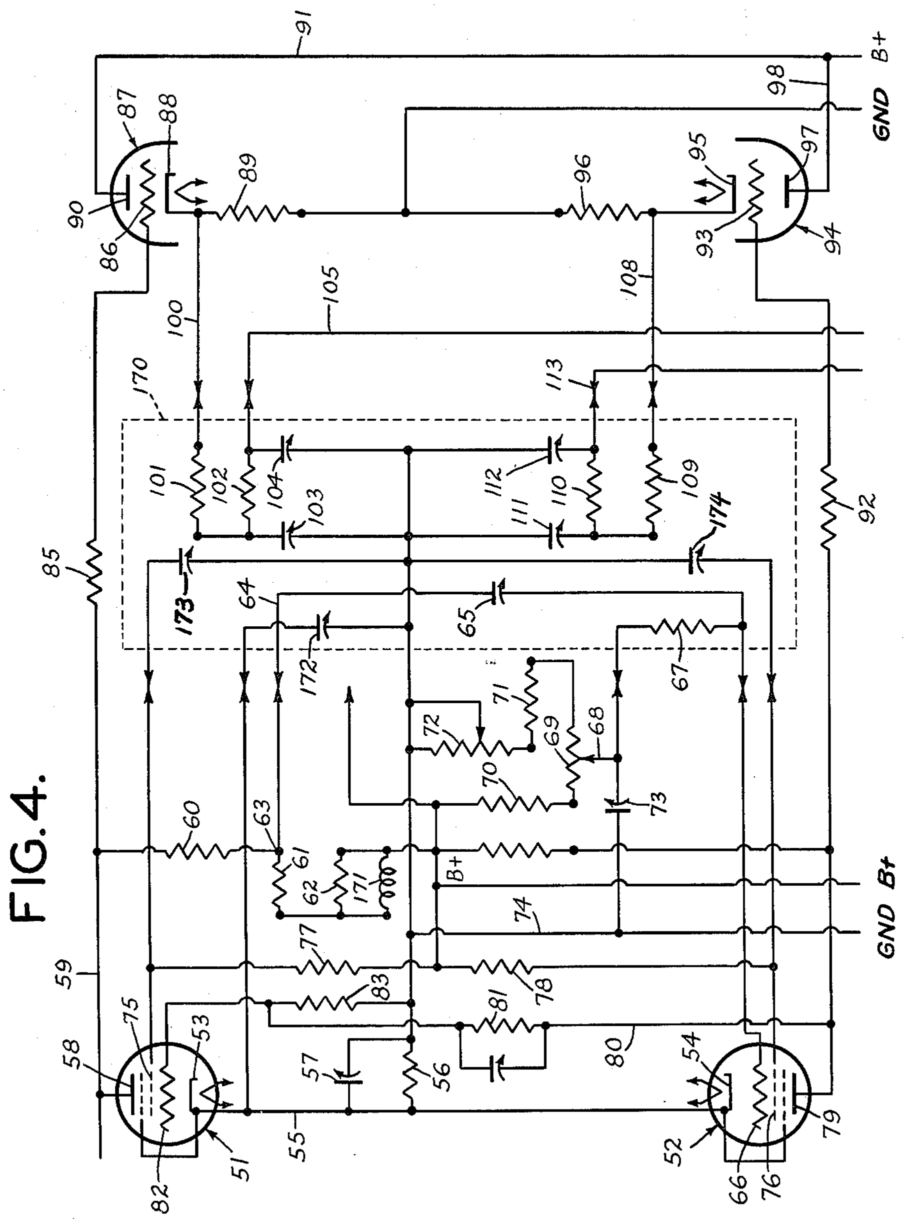
Fig. 4 illustrates schematically a preferred form of discriminator circuit for use in the system of Fig. 1.

Fig. 4 illustrates a practical form of discriminator circuit which is free from the above noted disadvantages of the basic discriminator shown in Fig. 2 over a considerably wider range of conditions. Referring to Fig. 4, the discriminator circuit comprises a pair of electron tubes 51 and 52. The tubes 51 and 52 are preferably sharp cut-off pentodes so as to provide a very high plate impedance ratio for positive to negative grid swing. The cathodes 53 and 54 of the tubes 51 and 52, respectively, are connected together by a conductor 55 and through a common cathode resistor 56 to ground, the resistor 56 being bypassed by a condenser 57. The plate electrode 58 of the tube 51 is connected by a conductor 59 through the resistors 60, 61 and 62 to the positive terminal of a source of plate supply voltage (not shown) which preferably is regulated in any known manner so as to enhance the stability of the discriminator circuit.

A connection is made from the junction 63 between the resistors 60 and 61 through a conductor 64 and a condenser 65 to the grid 66 of the tube 52, a resistor 67 being connected from the grid 66 to a variable contact 68 on a resistor 69. The condenser 65 and the resistor 67 determine the channel frequency. The resistor 69 is part of a voltage divider comprising the resistors 70, 69, 71 and 72 which is connected to the positive terminal of the source of plate supply voltage and to ground, as shown, a by-pass condenser 73 being connected between the adjustable tap 68 and ground through the conductor 74, and which applies positive grid bias to the tube 52 so that normally it is conducting.

The screen grid electrodes 75 and 76 of the tubes 51 and 52, respectively, are connected through the resistors 77 and 78, respectively, to the positive terminal of the source of plate supply voltage, as shown, filter condensers 173 and 174 being connected between the screen grids 75 and 76, respectively, and ground.

The plate electrode 79 of the tube 52 is connected through a conductor 80 and a resistor 81 to the control grid 82 of the tube 51, a resistor 83 being connected between the grid 82 and ground.

The voltage output appearing at the plate electrode 58 of the tube 51 is fed through a resistor 85 to the control grid 86 of an electron tube 87 which is preferably connected as a cathode follower, to reduce the signal impedance so that the carrier may be filtered by RC networks. Thus, its cathode 88 is connected through a cathode resistor 89 to ground and its plate 90 is connected through a conductor 91 to the positive terminal of a source of plate supply voltage (not shown). In similar fashion, the voltage output appearing at the plate 79 of the tube 52 is fed through a resistor 92 to the control grid 93 of an electron tube 94 which is also connected as a cathode follower, its cathode 95 being connected in series with a resistor 96 to ground and its plate 97 being connected by a conductor 98 to the positive terminal of the source of plate supply voltage.

Figure 5:
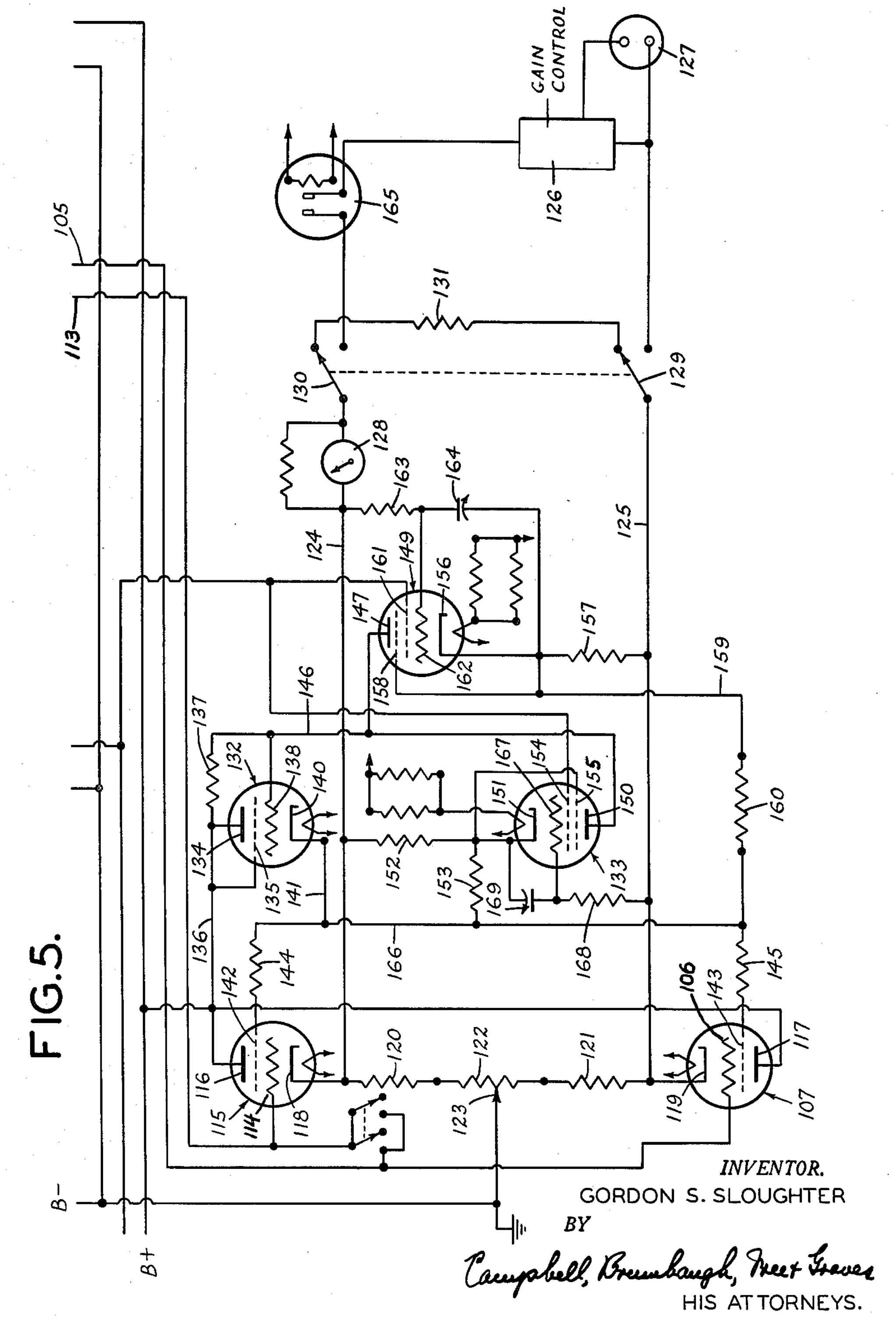
Fig. 5 is a schematic diagram of a circuit for recording the output of the discriminator of Fig. 4, in which means is provided for preventing overloading of the recording instrument.

The output from the cathode follower tube 87 is transmitted from the upper end of the cathode resistor 89 through a conductor 100 to a conventional two-stage filter which may comprise, for example, a pair of series resistors 101 and 102 and a pair of shunt condensers 103 and 104. The filtered output is then supplied through a conductor 105 to the grid electrode 106 of an amplifying electron tube 107 (Fig. 5). In similar fashion, the output of the cathode follower tube 94 is fed from its cathode 95 through a conductor 108 to a two-stage filter comprising the series resistors 109 and 110 and the shunt condensers 111 and 112. The filtered output is then fed through a conductor 113 to the grid electrode 114 of an amplifying tube 115 (Fig. 5).

The amplifying tubes 107 and 115 are preferably connected as cathode followers so as to provide a low impedance to the load. To this end, their plate electrodes 116 and 117, respectively, are connected to the positive terminal of the source of plate supply voltage, while their cathodes 118 and 119 are connected through the resistors 120 and 121, respectively, to a resistor 122 having a midtap 123 which is connected to ground. The outputs from the tubes 107 and 115 may be transmitted through the conductors 125 and 124, respectively, to a suitable gain control device 126, the output of which may be supplied to any indicating device such as a recording galvanometer 127, for example. An output meter 128 may be connected in the lead 124 for the purpose of enabling the output to be adjusted to zero or to any other desired value when the center frequency is being received from the band pass filter 11 (Fig. 1). Also, conventional ganged switches 129 and 130 may be provided for connecting the output to a dummy load 131, while the discriminator is being adjusted, for example.

If the output is to be connected to a galvanometer or other delicate instrument, it is desirable to include means to limit the output current in the event that failure of some part of the system should cause an off-scale reading. This may be accomplished, as shown in Fig. 5, by supplying screen grid voltage to the tubes 107 and 115 through the plate-cathode impedance of a tube 132, the grid bias of which is controlled by two other tubes 133 and 149. The plate 134 and the screen grid 135 of the tube 132 are connected together and through a conductor 136 to the positive terminal of the plate voltage supply. The cathode 140 of the tube 132 is connected by the conductors 141 and 166 and through the resistors 144 and 145, respectively, to the screen grid electrodes 142 and 143, respectively, of the tubes 115 and 107, respectively.

The grid 138 of the tube 132 is connected through a resistor 137 to the plate 134 and through a conductor 146 to the plate electrode 147 of tube 149 and to the plate 150 of the tube 133. The cathode 151 of the tube 133 is connected through a resistor 152 to the output lead 124 and through a resistor 153 to the conductor 166. The control grid 167 is connected through a resistor 168 to the output lead 125, a condenser 169 being connected between the grid 167 and the cathode 151. The screen grid electrode 154 of the tube 133 is connected to the positive terminal of the supply voltage while the suppressor grid 155 is connected to the cathode 151, as shown.

On the other hand, the cathode 156 of the tube 149 is connected in series with a resistor 157 to the output lead 125 and to the suppressor grid 158 of the tube 149, the cathode 156 also being connected by a conductor 159 and a resistor 160 to the resistor 145. The screen grid electrode 161 is connected to the positive terminal of the plate supply voltage while the control grid 162 is connected through a resistor 163 to the output lead 124, a by-pass condenser 164 being connected between the grid 149 and the cathode 156.

In the absence of a pulse output from the pulse generator 14 (Fig. 1), the discriminator circuit of Fig. 4 is inoperative, the tube 51 being nonconducting and the tube 54 being conducting by virtue of their respective grid return circuits. In operation, the circuit passes through one cycle of operation for each trigger pulse received from the pulse generator 14, the pulse being applied directly to the plate 58 of the tube 51 and through the conductor 59, the resistor 60, the conductor 64 and the condenser 65 to the grid 66 of the tube 52. This biases the tube 52 to cut-off so that the voltage at its plate 79 rises substantially to the plate supply voltage and applies a positive pulse through the conductor 80 and the resistor 81 to the control grid 82 of the tube 51, rendering the latter conducting.

The tubes 51 and 52 remain conducting and non-conducting, respectively, for a specific time until the condenser 65 discharges through the resistor 67 sufficiently to cause the tube 52 to begin conducting again. The circuit then returns abruptly to its initial condition in which it continues until the next succeeding pulse is received from the pulse generator 14.

During continuous operation of the discriminator, the instantaneous plate voltages of the tubes 51 and 52 are complementary rectangular waves and the average or filtered plate voltages at the conductors 105 and 113 (Fig. 4) are linear functions of the frequency at which the circuit is triggered. Fine and coarse adjustments of the output at the center frequency may be made by means of the resistors 69 and 72, respectively, since they affect the constant time during which the tube 51 is passing saturation current and the tube 52 is nonconducting, following each trigger pulse. The resistors 69 and 72 constitute balance controls and normally they are adjusted so that the meter 128 (Fig. 5) reads zero at the center frequency.

If the output current in the leads 124 and 125 exceeds a predetermined value say, 10 milliamperes in either direction, either the tube 133 or the tube 149, which are normally biased to cut-off, will begin to conduct and will apply negative bias to the control grid 138 of the tube 132, thus increasing its plate-to-cathode impedance and reducing the screen grid voltage applied to the output tubes 107 and 115. With this construction, the output under the most extreme conditions can be limited to a predetermined value of, say 15 milliamperes, or 150% band-edge output, which will not be sufficient to damage the galvanometer or other recording instrument receiving the output of the discriminator.

If desired, a thermal relay 165 may be connected in series with the lead 124 for the purpose of preventing any output from reaching the gain control device 126 until a predetermined time has elapsed after power has been applied to the circuits.

In order to facilitate operation selectively at any one of a plurality of sub-carrier frequencies, a plurality of channel plug-in units 170 (Fig. 4) may be provided, each of which will contain all components needed for operation at a given center frequency with a corresponding intelligence pass band. Channel plug-in units 170 for high frequencies may include a choke 171 in shunt with the resistor 62 to provide improved wave form and linearity. Units designed for low frequencies may include a condenser 172 to provide additional decoupling in the cathode circuits of the tubes 51 and 52.

For channels in which an intelligence band of 0 to 3% of the sub-carrier frequency is required, an additional RC filter section may be included between each of the tubes 87 and 94 and the tubes 115 and 107. Channels requiring higher percentages of modulation frequency may require LC filters instead of RC filters to suppress the sub-carrier without attenuating the higher intelligence frequencies.

In a typical installation, a discriminator system according to the invention may be designed to provide an accurately linear and stable input of ±10 to ±10.5 ma. for a ±7½% deviation of the sub-carrier, suitably designed plug-in units 170 being provided to enable use of any center frequency from 400 cps. to 70 kc., the intelligence frequencies ranging from D. C. to A. C. of frequencies equal to several percent of the carrier frequency.

If desired, frequency deviations as high as ±20% may be employed, provided that attenuation is included in the plug-in units 170 to give 10 ma. output for the band-edge frequency. Greater frequency deviations may be employed without sacrificing output linearity as a function of frequency by operating the discriminator as if the center frequency were somewhat higher than the value actually being received. Loading resistors may then be employed in the output circuits of the tubes 87 and 94 to provide a balanced output under this condition.

It will be understood from the foregoing description that the invention provides a novel and highly effective frequency modulation discriminator network for use in applications such as multichannel telemetering, for example. Since the discriminator tubes are alternately saturated and cut-off, a relatively large output may be obtained. Further, by operating the tubes between saturation and cut-off, changes in tube characteristics have very little effect. Further improvement in stability results from the fact that the discriminator is almost completely isolated from the incoming signal, being actuated each cycle by a trigger pulse which may be accurately controlled. This isolation is in a large measure responsible for the excellent stability of this discriminator with respect to amplitude modulation of the subcarrier.

The several representative embodiments described above are intended to be merely illustrative and are not to be regarded as imposing any restrictions whatsoever upon the scope of the following claims.

I claim:

1. In frequency modulation discriminator apparatus, the combination of band pass filter means responsive to a selected frequency modulated signal, means for amplifying the output of said band pass filter means, means for converting said amplified frequency modulated output to square wave form, means for receiving the frequency modulated square wave form and producing pulses in timed relation thereto, unbalanced trigger circuit means comprising first and second electron tubes each having plate, grid and cathode electrodes, a connection for impressing said pulses on the plate of said first tube, means for applying bias voltage to the grid of said first tube to render the same nonconducting, means for applying bias voltage to the grid of said second tube to render the same conducting, a connection from the plate of said second tube to the grid of said first tube, a connection from the plate of said first tube to the grid of said second tube including a condenser, a resistor connected across the grid and cathode of said second tube, first filter means for filtering potential variations at the plate of said first tube, second filter means for filtering potential variations at the plate of said second tube, and circuit means responsive to the sum of the filtered potential variations at the plates of said first and second tubes.

2. In frequency modulation discriminator apparatus, the combination of first and second electron tubes each having plate, control grid, screen grid and cathode electrodes, cathode resistor means connected to the cathodes of said tubes and to ground, circuit means including a condenser connecting the plate of said first tube to the grid of said second tube, a resistor connected between the grid of said second tube and ground, means for biasing the grid of said second tube positively to render the same conducting, second circuit means connecting the plate of said second tube to the grid of said first tube, a resistor connected between the grid of said first tube and ground, a source of regulated voltage, connections between said source and the screen grid and plate electrodes of said tubes, first filter network means connected between the plate of said first tube and ground, second filter network means connected between the plate of said second tube and ground, and circuit means connecting the outputs of said first and second filter network means in series opposition.

3. In frequency modulation discriminator apparatus, the combination of first and second electron tubes each having plate, control grid, screen grid and cathode electrodes, cathode resistor means connected to the cathodes of said tubes and to ground, circuit means including a condenser connecting the plate of said first tube to the grid of said second tube, a resistor connected between the grid of said second tube and ground, means for biasing the grid of said second tube positively to render the same conducting, second circuit means connecting the plate of said second tube to the grid of said first tube, a resistor connected between the grid of said first tube and ground, a source of regulated voltage, connections between said source and the screen grid and plate electrodes of said tubes, third and fourth electron tubes having plate, grid and cathode electrodes and connected as push-pull cathode followers, first circuit means connecting the plate of said first tube to the grid of said third tube, second circuit means connecting the plate of said second tube to the grid of said fourth tube, means connecting the plates of said third and fourth tubes to plate supply source means, a circuit including a pair of cathode resistors connected between the cathodes of said third and fourth tubes, first filter network means connected to the cathode of said third tube and ground, second filter network means connected to the cathode of said fourth tube and ground, and third circuit means connecting the outputs of said first and second filter means in series opposition.

4. In a discriminator for a frequency modulated wave, the combination comprising means responsive to a selected frequency modulated signal for producing negative pulses in timed relationship, unbalanced trigger circuit means including first and second electron tubes each having plate, grid and cathode electrodes, means for applying said negative pulses to the plate of said first tube, a positive voltage supply terminal, first and second plate resistors connected serially between the plate of said first tube and said terminal, biasing means including a third resistor connected between said terminal and the grid of said second tube, means for coupling the plate of said second tube to the grid of said first tube, and a condenser connected in series between said first plate resistor and the grid of said second tube to pass discharge currents from said terminal through said third and first resistors upon the application of each of said pulses to the plate of said first tube and after each pulse to pass charging current from said terminal through said second resistor and the grid-cathode circuit of said second tube, and integrating means connected with said plates to derive a signal whose amplitude is a function of the frequency of said frequency modulated signal.

References Cited in the file of this patent

UNITED STATES PATENTS

| | | |
|---|---|---|
| 2,284,444 | Peterson | May 26, 1942 |
| 2,323,596 | Hansell | July 6, 1943 |
| 2,399,135 | Miller et al. | Apr. 23, 1946 |
| 2,428,264 | Crosby | Sept. 30, 1947 |
| 2,432,204 | Miller | Dec. 9, 1947 |
| 2,441,957 | De Rosa | May 25, 1948 |
| 2,443,057 | Shea | June 8, 1948 |
| 2,444,036 | Crost | June 29, 1948 |
| 2,450,443 | Rich | Oct. 5, 1948 |
| 2,484,556 | Custin | Oct. 11, 1949 |
| 2,530,081 | Ross | Nov. 14, 1950 |
| 2,540,876 | Hansell | Feb. 6, 1951 |